(12) United States Patent
Schneider (10) Patent No.: US 11,049,206 B1
(45) Date of Patent: Jun. 29, 2021

(54) ENHANCED CONTENT GENERATION SYSTEM, METHOD, AND DEVICE

(71) Applicant: Eric Schneider, Delray Beach, FL (US)

(72) Inventor: Eric Schneider, Delray Beach, FL (US)

( * ) Notice: Subject to any disclaimer, the term of this patent is extended or adjusted under 35 U.S.C. 154(b) by 0 days.

(21) Appl. No.: 16/999,041

(22) Filed: Aug. 20, 2020

(51) Int. Cl.
*G06Q 50/18* (2012.01)
*G06Q 40/04* (2012.01)
*G06F 16/248* (2019.01)
*G06F 16/245* (2019.01)

(52) U.S. Cl.
CPC ......... *G06Q 50/184* (2013.01); *G06F 16/245* (2019.01); *G06F 16/248* (2019.01); *G06Q 40/04* (2013.01)

(58) Field of Classification Search
CPC .... G06Q 50/184; G06F 16/245; G06F 16/248
See application file for complete search history.

(56) References Cited

U.S. PATENT DOCUMENTS

| | | | |
|---|---|---|---|
| 8,145,634 B2 * | 3/2012 | Hugley | G06Q 10/10 707/736 |
| 8,667,609 B2 * | 3/2014 | Tan | G06F 16/24 726/32 |
| 8,938,257 B2 | 1/2015 | Chao et al. | |
| 9,323,970 B2 * | 4/2016 | Hart | G06F 16/9554 |
| 9,910,899 B1 * | 3/2018 | Fields | G06F 16/3344 |
| 10,068,018 B2 * | 9/2018 | Zhang | G06K 9/52 |
| 10,614,582 B2 * | 4/2020 | Pereira | G06T 7/60 |
| 10,699,488 B1 | 6/2020 | Terrano | |
| 10,708,646 B2 | 7/2020 | Tumanov | |
| 2002/0007282 A1 * | 1/2002 | Utsumi | G06Q 50/184 705/310 |
| 2002/0035571 A1 | 3/2002 | Coult | |
| 2002/0077835 A1 * | 6/2002 | Hagelin | G06Q 50/184 705/310 |
| 2003/0036945 A1 * | 2/2003 | Del Vecchio | G06Q 50/184 705/310 |
| 2008/0033736 A1 * | 2/2008 | Bulman | G06Q 50/184 705/310 |
| 2010/0153282 A1 * | 6/2010 | Graham | G06Q 10/10 705/310 |
| 2010/0262512 A1 | 10/2010 | Lee et al. | |
| 2011/0131142 A1 | 6/2011 | Malackowski et al. | |
| 2011/0225019 A1 * | 9/2011 | Taylor | G06Q 30/0185 705/7.28 |
| 2012/0096027 A1 | 4/2012 | Coult | |
| 2013/0132288 A1 * | 5/2013 | Ng | G06Q 50/184 705/310 |
| 2014/0164262 A1 * | 6/2014 | Graham | G06Q 40/04 705/310 |
| 2014/0258144 A1 * | 9/2014 | Timothy | G06Q 10/087 705/310 |
| 2016/0005126 A1 * | 1/2016 | Ghosh | G06Q 40/06 705/36 R |

\* cited by examiner

*Primary Examiner* — Namrata Boveja
*Assistant Examiner* — Pierre L Maccagno (57) ABSTRACT

A computer implemented method includes receiving content to present to a user where the content does not include results of a universal product code search request, a constructive notice discovery engine determining that at least a portion of the content includes an intellectual property mark owned by a publicly traded company located near constructive notice language, retrieving a ticker symbol corresponding to the publicly traded company, and presenting the content to the user with at least one option to the user for performing at least one operative function corresponding to the ticker symbol.

19 Claims, 7 Drawing Sheets

| Notice Symbols | ™ | ® | © |
|---|---|---|---|
| VPM Symbols | Pat No | US patent | Patent Pending |
| Brand Names | Apple | Tesla | Netflix |

Intellectual Property Mark Detection Data 510
515
520

| 530 | 535 | 540 | 545 | 550 |
|---|---|---|---|---|
| URL | Ticker | Patent | Trademark | Copyright |
| abc.com/path | ABC | 5987464 | 78123456 | SR234567 |
| xyz.com/path | XYZ | 9659070 | 78765432 | PA876543 |

Virtual Intellectual Property Marking Database

ENHANCED CONTENT GENERATION SYSTEM, METHOD, AND DEVICE

FIELD OF THE INVENTION

This invention generally relates to a computer implemented content generation method and more specifically relates to a system, method, and device for generating and displaying enhanced content in response to the analysis and detection one or more intellectual property marks.

BACKGROUND OF THE INVENTION

Some market participants make trading or investment decisions based upon confidence in a company's stock performance and in some cases their confidence may be influenced by brands and other intellectual property owned by the company.

U.S. Pat. No. 9,323,970 issued on Apr. 26, 2016 by Hart, et al., entitled, "Trading interface retrieved based on barcode data" enables a user to access a trading interface based on determining a public company associated to a Universal Product Code (UPC) code but is silent with respect to brands, trademarks, and other intellectual property of the public company. U.S. Patent Application 20160005126 filed on Jul. 3, 2014 by Ghosh, entitled, "System and method for investment portfolio recommendations based on purchasing and retail location" similarly discloses scanning a code associated with, taking a picture of, or otherwise receiving a product or service identifier associated with a public company to access a trading interface and is also silent with respect to brands, trademarks, and other intellectual property of the public company.

The prior art cited above relies upon a user initiating and providing a product code as input as a means to access a trading interface or market data and fails to consider non-product code types of requests and other forms of input or responses to such input for accessing such market data or trading interface. For instance, prior art is silent regarding pushed or streamed content or in response to the initiation of other request types for data resources.

Accordingly, in light of the above, there is a strong need in the art for systems, methods, and devices to overcome these limitations and provide a user with more opportunity to present and act upon market information in response to received content.

SUMMARY OF THE INVENTION

The present invention enables the presentation of enhanced content in response to streaming content or a user request. The present invention provides discovery, detection, and analysis of candidate intellectual property marks owned by public entities. The present invention enables a user to perform operative actions in connection to discovered public companies found in received content and provides such options to the user while the received content is presented.

In general, in accordance with the present invention a computer implemented method, the method implemented on a computer system by one or more processors configured to execute instructions that, when executed by the one or more processors, direct the computing system to perform acts including receiving content to present to a user where the content does not include results of a product code search request, an intellectual property mark analysis engine determining that at least a portion of the content includes an intellectual property mark owned by a publicly traded company, retrieving a ticker symbol corresponding to the publicly traded company, and presenting the content to the user with at least one option to the user for performing at least one operative function corresponding to the ticker symbol.

In accordance with another aspect of the present invention a computer implemented method, the method implemented on a computer system by one or more processors configured to execute instructions that, when executed by the one or more processors, direct the computing system to perform acts including receiving content to present to a user where the content does not include results of a universal product code search request, a constructive notice discovery engine determining that at least a portion of the content includes an intellectual property mark owned by a publicly traded company located near constructive notice language, retrieving a ticker symbol corresponding to the publicly traded company, and presenting the content to the user with at least one option to the user for performing at least one operative function corresponding to the ticker symbol.

In accordance with an aspect of the present invention, an article of manufacture including a non-transitory computer readable medium having instructions stored thereon, the instructions configured to cause a computer to perform operations including one or more a computer implemented methods listed above.

In accordance with another aspect of the present invention, an apparatus includes a memory element of a computer configured to store computer readable instructions in operative association with a processor for the computer configured to read and execute the computer readable instructions stored in the non-transitory computer readable medium listed above.

BRIEF DESCRIPTION OF THE DRAWINGS

FIG. 4-A is a block diagram of a processor used to curate and update a public company intellectual property mark owner database in accordance with the present invention.

FIG. 4-B is a block diagram of a processor used to generate candidate intellectual property mark matches in accordance with the present invention.

FIG. 5-A is a depiction of a portion of a data structure for the intellectual property mark detection database in accordance with the present invention.

FIG. 5-B is a depiction of a portion of a data structure for the virtual intellectual property marking database in accordance with the present invention.

DETAILED DESCRIPTION OF THE INVENTION

The present invention will now be described with reference to the drawings, wherein like reference numerals are used to refer to like elements throughout.

Figure 1:
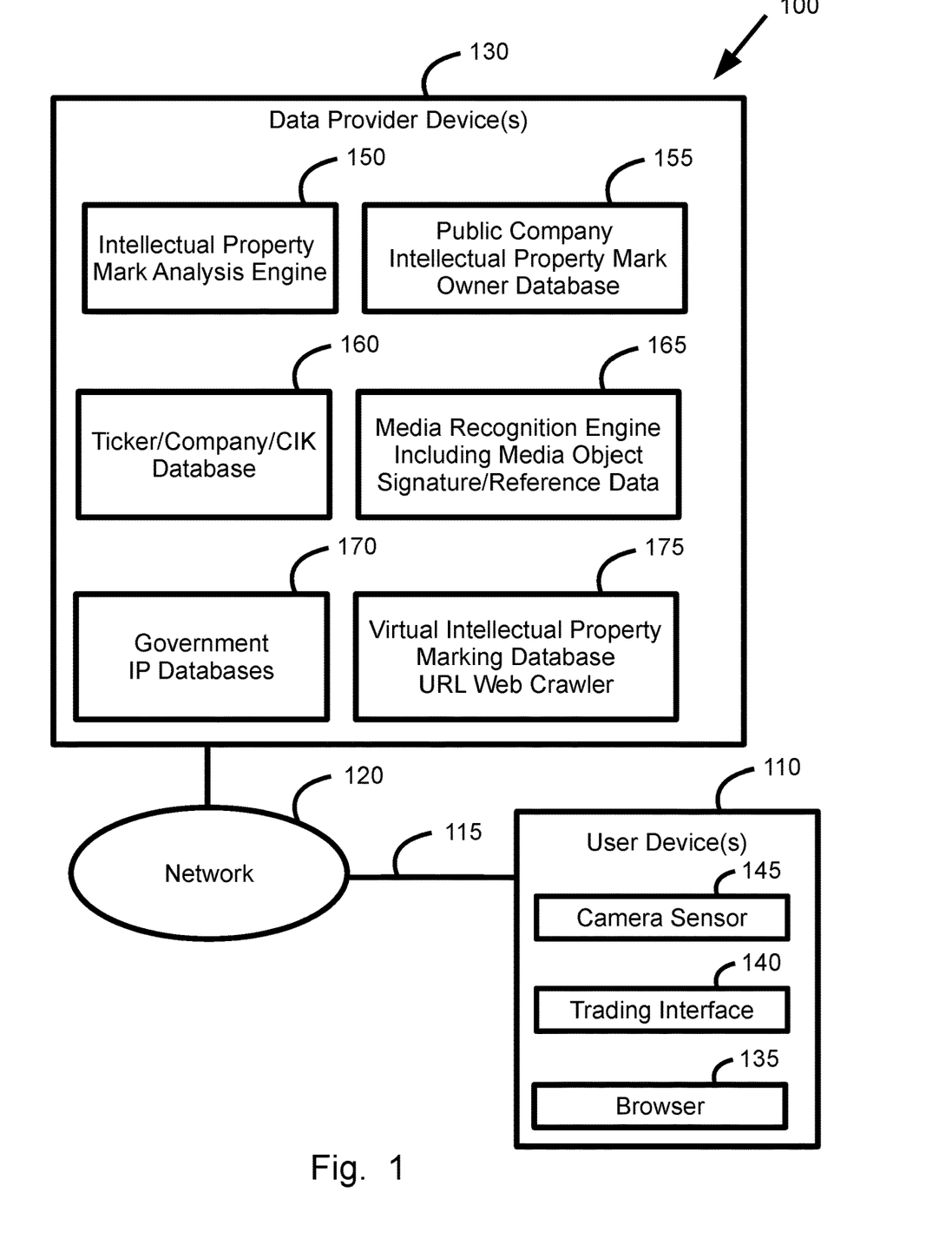
FIG. 1 is a block diagram of an exemplary distributed computer system in accordance with the present invention.

FIG. 1 illustrates an exemplary system for providing a distributed computer system 100 in accordance with one aspect of the present invention and includes one or more network access devices such as device of a user 110, connected 115 via a network 120. The network 120 may use Internet communications protocols (IP) to allow network access devices 110 communicate with each other to communicate intellectual property mark related data stored and streamed from the cloud via at least one data provider device 130, for example. Such network access devices 110 and data provider devices 130 can be configured as client/server, peer-to-peer, publish-subscribe, processing agent, ad-hoc, and the like. It is understood that a single network access device 110 and a data provider device 130 may be configured to perform both the client/server or publisher/subscriber roles.

The communication device of such network access device may include a transceiver, a modem, a network interface card, or other interface devices to communicate with the electronic network 120 and may further be operatively coupled to and/or include a Global Positioning System (GPS) via a GPS receiver (not shown). The modem may communicate with the electronic network 120 via a line 115 such as a telephone line, an ISDN line, a coaxial line, a cable television line, a fiber optic line, or a computer network line. Alternatively, the modem may wirelessly communicate with the electronic network 120. The electronic network 120 may provide an on-line service, an Internet service provider, a local area network service, a wide area network service, a cable television service, a wireless data service, an intranet, a satellite service, or the like.

Such network access devices may be hand held devices, smart phones, palmtop computers, personal digital assistants (PDAs), tablets, notebook, laptop, portable computers, desktop PCs, workstations, and/or larger/smaller computer systems. It is noted that the network access devices may have a variety of forms, including but not limited to, a general purpose computer, a network computer, an internet television, a set top box, a web-enabled telephone, an internet appliance, a portable wireless device, a game player, a video recorder, and/or an audio component, for example. Certain types of electronic devices which are portable and easily carried by a person from one location to another may sometimes be referred to as a "portable electronic device" or "portable device". Some non-limiting examples of portable devices include: cell phones, smartphones, tablet computers, laptop computers, wearable computing device (e.g., a smart watch, a wearable activity monitor, wearable smart jewelry, smart earpieces, and glasses and other optical devices that include optical head-mounted displays (OHMDs), an embedded computing device (e.g., in communication with a smart textile or electronic fabric), and any other type of computing device that may be configured to store data and software instructions, execute software instructions to perform operations, and/or display information on a display device.

User device(s) 110 can further include a browser 135, a trading interface 140, and camera sensor 145 whereas data provider devices can also include intellectual property mark analysis engine 150, public company intellectual property mark owner database 155, company name/ticker/CIK database 160, media recognition engine with access to media object signature and reference data 165, various government IP databases 170, and a virtual intellectual property mark database with URL access to a web crawler 175.

Figure 2:
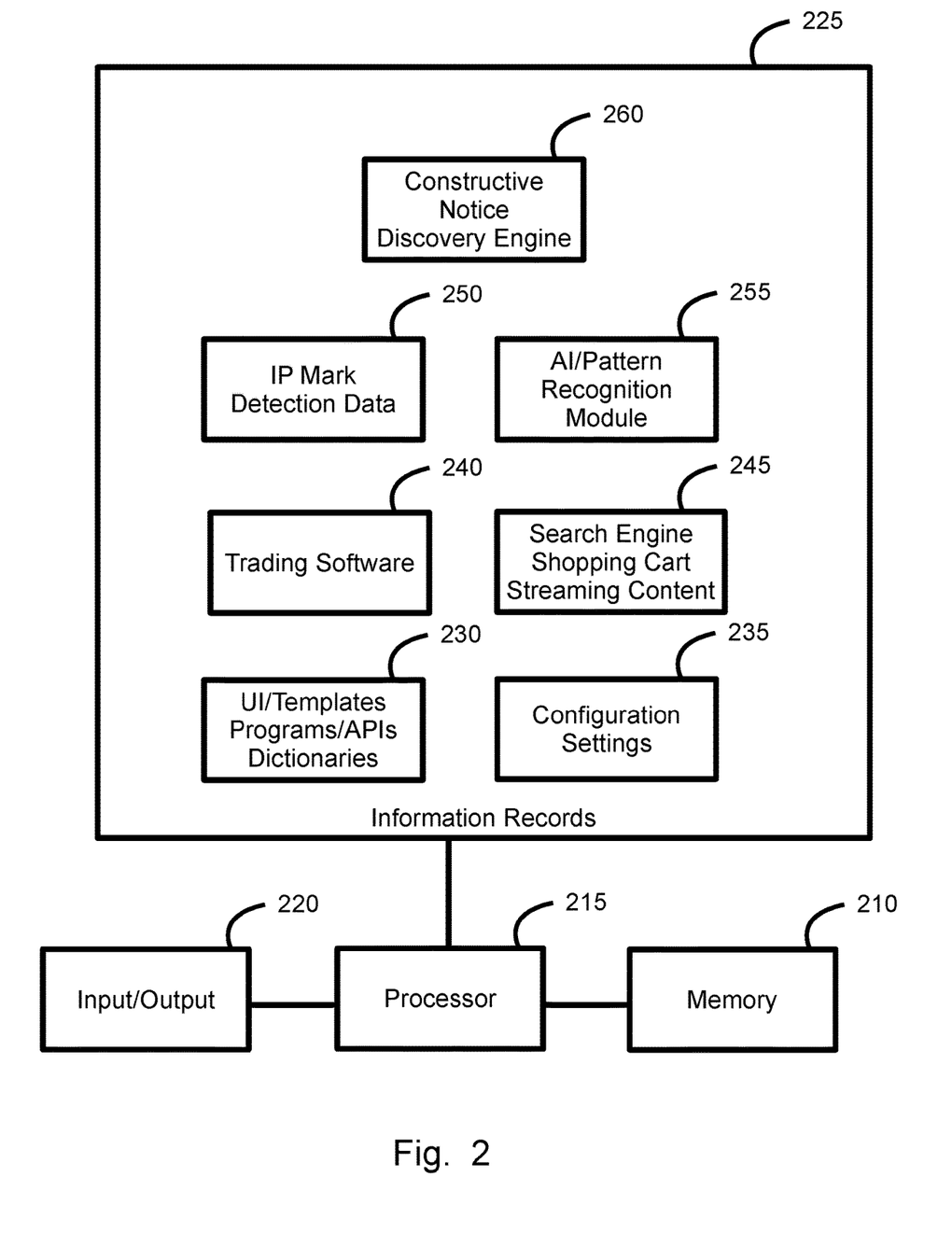
FIG. 2 is a block diagram illustrating exemplary information records stored in memory in accordance with the present invention.

Each network access device may typically include one or more memories 210, processors 215, and input/output devices 220. An input device may be any suitable device for the user to give input, for example: a keyboard, a 10-key pad, a telephone key pad, a light pen or any pen pointing device, a touchscreen, a button, a dial, a joystick, a steering wheel, a foot pedal, a mouse, a trackball, an optical or magnetic recognition unit such as a bar code or magnetic swipe reader, a voice or speech recognition unit, a remote control attached via cable or wireless link to a game set, television, and/or cable box. A data glove, an eye-tracking device, or any MIDI device may also be used. A display device may be any suitable output device, such as a display screen, text-to-speech converter, printer, plotter, fax, television set, or audio player. Although the input device is typically separate from the display device, they may be combined; for example: a display with an integrated touchscreen, a display with an integrated keyboard, or a speech-recognition unit combined with a text-to-speech converter.

Those skilled in the art will appreciate that the computer environment 100 shown in FIG. 1 is intended to be merely illustrative. The present invention may also be practiced in other computing environments. For example, the present invention may be practiced in multiple processor environments wherein the network access device includes multiple processors. Moreover, the network access device need not include all of the input/output devices 220 as discussed above and may also include additional devices. Those skilled in the art will appreciate that the present invention may also be practiced via Intranets and more generally in distributed environments in which a network access device requests resources from another network access device.

FIG. 2 illustrates a block diagram of a storage device such as memory 210 in operative association/communication with a processor 215. The processor 215 is operatively coupled to input/output devices 220 in network access devices for users and participants of intellectual property mark related data. Stored in memory 210 may be information records 225 having any combination of exemplary content such as lists, files, relational pointers, programs, interfaces, engines, modules, templates, rule sets, libraries, and databases. Such records may include for example: user interfaces/templates/programs/APIs (application programming interface)/dictionaries 230, configuration settings 235, trading software 240, search engine/shopping cart/streaming content 245, IP mark detection data 250, AI/pattern recognition module 255, and constructive notice discovery engine 260. These information records may be further introduced and discussed in more detail throughout the disclosure of this invention.

Figure 3:
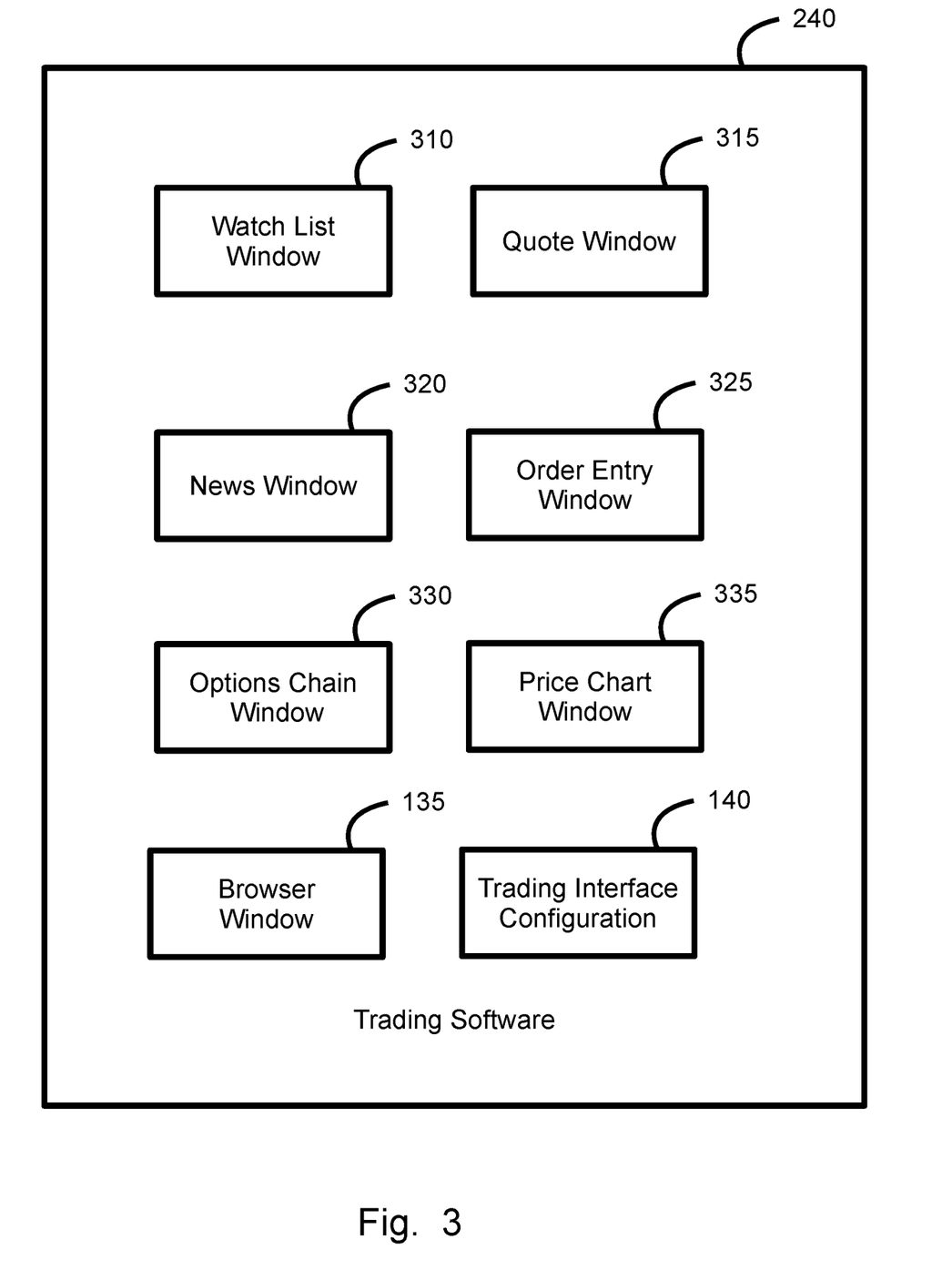
FIG. 3 illustrates a block diagram of elements found in trading software in accordance with the present invention.

FIG. 3 illustrates a block diagram of elements found in trading software 240 including a watch list window 310, market quote window 315, news window 320, order entry window 325, options chain window, and price chart window 335. Configuration settings 235 can be adapted to automatically log a user in to their trading account via the trading software 240 to access any of the above interface windows in response to performing an operative action by the user. Further elements can include a web browser window 135 built in to the trading software along with a trader user interface 140 with native configuration settings. These trading interface elements may be further introduced and discussed in more detail throughout the disclosure of this invention.

Figure 4:
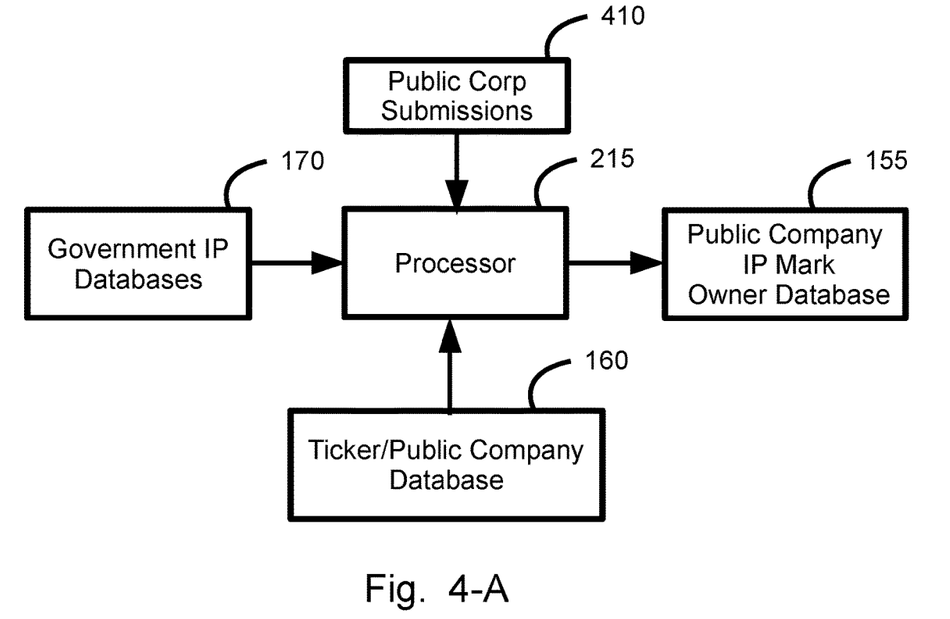

FIG. 4-A is a block diagram of a processor used to curate and update a public company intellectual property mark owner database in accordance with the present invention. A device processor 215 can receive a public company name corresponding to it's ticker symbol 160 as a query source to access and search one or more related government intellectual property databases 170 to retrieve data for the processor 215 to generate, store, verify, or update data records in the public company intellectual property mark owner database 155. The processor 215 can receive data from another query source to access records found in a public company submission database 410 (data provided by participating public companies as an authority of their own marks) that can also be used by the processor to generate, store, verify, or update records in the public company intellectual property mark owner database 155. Some governmental intellectual property databases can include searching or browsing USPTO databases such as patent full-text (PatFT), patent application full-text (AppFT), Official Gazette for Patents, Trademark Electronic Search System, or Official Gazette for Trademarks, for example. There are several third party sources that offer similar information and could also be used as source data like data found from Google Patents or the like. Ticker Symbol-Company Name pairings can be accessed via each stock exchange or from many third party sources providing similar name-value pair correspondence.

FIG. 4-B is a block diagram of a processor used to generate candidate intellectual property mark matches in accordance with the present invention. A device processor 215 can apply an intellectual property analysis engine 150 to received or streaming content 420 from a network request and the processor 215 can parse words, phrases, images through the intellectual property analysis engine 150 which can also be in operative communication with the constructive notice discovery engine 260 and compare such parsed data against a dictionary such as an intellectual property mark data detection dictionary 250 which can include constructive notice language and symbols to lower the amount of used computing resources and identify candidate intellectual property marks 430 near such language which can then be compared by the processor 215 with the public company intellectual property mark database 155 to determine and rank candidate mark matches 430.

Figure 5:
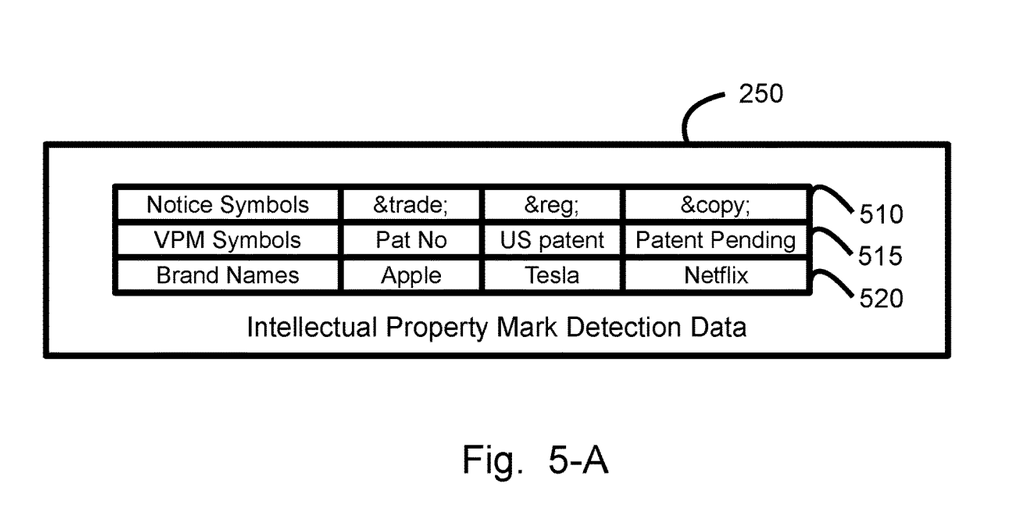

FIG. 5-A is a depiction of a portion of a data structure for the intellectual property mark detection database in accordance with the present invention. The intellectual property mark detection database 250 can include one or more records of data fields such as construction notice symbols 510, virtual patent marking (VPM) symbols 515, and brand name symbols 520, to name a few. Notice symbols 510 can include SM, TM or a specific class of markup language notice symbols such as ™ ® and © as an example. VPM symbols 515 can include Patent Pending, US Pat No., Patent, Patent Number, Patent No., a marking statute (e.g., 287(*a*) a keyword for US code found in web pages to comply with VPM as a tool to locate a patent number in association with a public company), and brand name symbols 520 which can include a master keyword list of all trademarks for all SP500 companies, as an example of using a small list to quickly identify candidate matches of larger more frequently traded public companies. Of course, other symbol sets and lists can be used to associate trademarks and other intellectual property marks associated with public companies listed in the NYSE, NASDAQ, Dow Jones, or other fund or index. Other examples of keywords used by the constructive notice discovery engine 260 could be the phrase "All Rights Reserved" for copyrights or "copy" or "copyright" or HTML notice symbol ℗ for copyright sound recordings. Other intellectual property notice symbols in Unicode can include © ® ℗ ℠ ™ which can be used for candidate IP mark detection upon constructive notice discovery.

FIG. 5-B is a depiction of a portion of a data structure for the virtual intellectual property marking database in accordance with the present invention. The virtual intellectual property marking database 175 include one or more records of data fields such as URL 530, ticker 535, patent marking, 540, trademark marking 545, and copyright marking 550 to name a few. Web pages can be crawled and when VPM notice language is discovered in part by parsing and matching to VPM symbol data 515 patent numbers and publication numbers that can be extracted and stored along with the corresponding URL in the virtual intellectual property marking database 175.

Those skilled in the art will appreciate that the correspondence and operative association between data fields and/or data files can take on one-to-one, one-to-many, many-to-one, and many-to-many relationships. Relationships of data structures can take the form of delimited files, lists, tables, arrays, hashes, database records, objects, trees, graphs, rings, hub-spoke, and the like.

Figure 6:
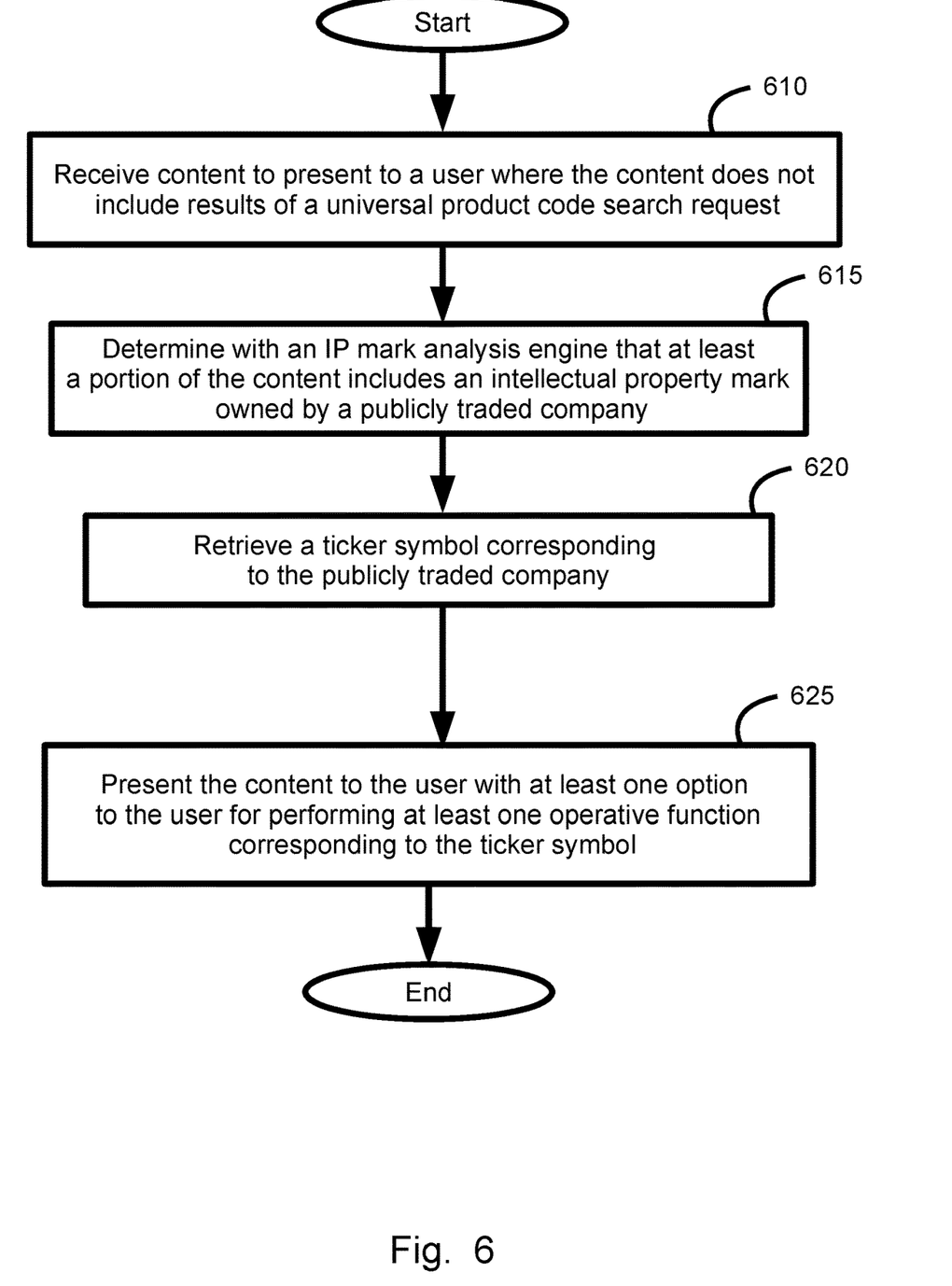
FIG. 6 is a flowchart illustrating the steps performed for presenting content to a user in accordance with the present invention.

FIG. 6 is a flowchart illustrating the steps performed for presenting content to a user in accordance with the present invention. When a network access device 110 receives content 420 a device processor 215 in operative communication with an intellectual property mark analysis engine 150 can receive content in step 610 to present to a user where the content does not include results of a universal product code search request then determine in step 615 with the IP mark analysis engine 150 that at least a portion of the content includes an intellectual property mark owned by a publicly traded company. A ticker symbol corresponding to the publicly traded company can then be retrieved in step 620 and the content can be presented in step 625 to the user with at least one option to the user for performing at least one operative function corresponding to the ticker symbol.

Figure 7:
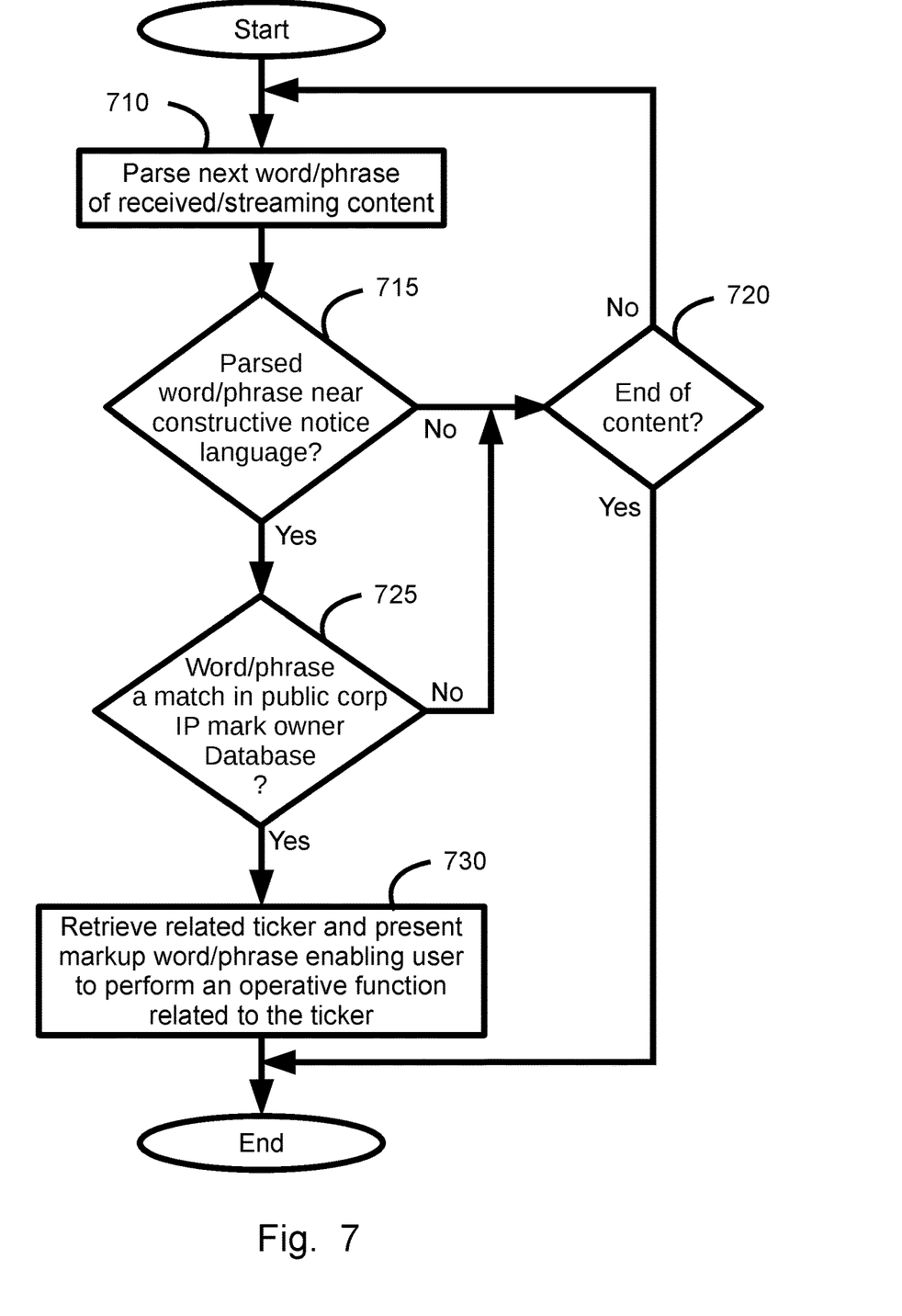
FIG. 7 is a flowchart illustrating the steps performed for enabling a user to perform an operative function in accordance with the present invention.

FIG. 7 is a flowchart illustrating the steps performed for enabling a user to perform an operative function in accordance with the present invention. When a network access device 110 receives content 420 a device processor 215 in operative communication with an intellectual property mark analysis engine 150 which can be in further operative communication with a constructive notice discovery engine 260 can parse in step 710 the next word or phrase from the streamed or received content 150 and determine in step 715 whether the parsed word or phrase is positioned near constructive notice language such as mark notice symbols and the like. If not, then it is determined in step 720 whether there is any further content to parse. If there is no more content then the procedure terminates otherwise the procedure returns to parse (step 710) the next word or phrase from the streamed or received content 150. When it is determined (step 715) that the parsed word or phrase is positioned near the constructive notice language, then it is determined in step 725 whether the word or phrase matches any records found in the public company intellectual property mark owner database 155. If not, then the procedure returns to determining (step 720) whether there is any more content otherwise when matched records are found (step 725) then a ticker symbol is retrieved in step 730 relating to the word or phrase which is then marked up and presented to the user enabling the user to have an option to perform an operative function in connection with the ticker symbol and word/phrase.

For example, a user can surf the web with a browser built 135 into a trading interface 140 and request with a URL, content from a network resource, when content is returned to the browser and an intellectual property mark of a public company is matched in the content, for instance, when the constructive notice discovery engine locates a markup constructive notice symbol such as ™ the analysis engine can identify in this case a candidate trademark adjacent to the notice symbol as a candidate mark and when a match is verified. the content can be enhanced by creating a hyperlink having the intellectual property mark as the hyperlink label and the URL link can include name-value pairs to be passed in order to perform the operative action with such name-value pairs including passing the ticker symbol, user authentication, or login information as well as which action to perform such as presenting a quote window 315, order entry window 325, or price chart window 335 associated with the ticker and user account, all of which can be specified in user configuration settings. In a standalone browser 135, a browser extension can include configuration settings that the user can specify which brokerage account to associate for custom hyperlink generation upon detection and match of intellectual property marks owned by a public company while receiving content in real time.

The above system can be applied to all received content from any non-product code request such as from a search engine request or commerce request associated with an electronic shopping cart. For instance, requests travel map information for location or directions and receives point of interest associated with such a content request, points of interest associated with public companies can be identified and enhanced content can enable a user to perform an operative action with a ticker symbol associated with the public company corresponding to the point of interest. The enhanced content can be shown in response to hovering over or clicking the point of interest with a mouse.

Similarly, when a ecommerce website returns a receipt of items ordered from a shopping cart, the browser extension can identify a trademark associated with the purchase owned by a public company and enhanced content can be presented to the user along with the electronic receipt to have the option to perform an operative action with the ticker symbol of the public company enabling a user to purchase stock in the company and not just the company product that was just purchased. Of course, such enhanced content can be presented to the user before checkout of the electronic shopping cart. There are numerous applications of the instant invention including providing enhanced content while scheduling, messaging, conferencing, advertising (banner ads), or broadcasting to name a few.

In another example, closed caption can be accessed from streaming content as a source for intellectual property mark detection. Content is not limited to only text by way of intellectual property mark analysis and can also be applied to both still and moving images of names, marks, logos and the like by processing content with a media recognition engine with access to media object signature and reference data 165 in operative communication with the intellectual property analysis engine 150. A camera sensor 145 can also serve as an input source for recording images and detecting any associated candidate intellectual property marks. In some instances, such marks may, for example, be identified or recognized based, at least in part, on its uniformity or consistency of use with respect to its shape, color, size, text, text size, placement or arrangement of visual elements, or the like.

The methods shown above can be employed via trading software in operative communication with a web browser either native or standalone which can include a browser extension, browser helper object (BHO), or applet, for example, to create an object listener for real time detection of candidate intellectual property marks of public companies found in received or streaming content. BHO could monitor essentially all types of user inputs to the browser: mouse pointer movement, selections, manipulation of user interface elements in a web page, data provided through web forms, the URLs of web pages requested and viewed, and the contents of requests made to web servers.

The intellectual property mark analysis engine can be in operative communication with a constructive notice discovery engine for the detecting one or more candidate intellectual property marks in the received or streamed content and can be in further operative communication with a public company intellectual property mark owner database which includes one or more records of a publicly traded company corresponding to one or more intellectual property marks owned by the publicly traded company that can determine that content includes the intellectual property mark by parsing words and phrases in the content and identifying one or more intellectual property marks by matching at least one word and phrase of the words and phrases found in one or more records of the public company intellectual property mark owner database or by detecting in the content one or more candidate intellectual property marks positioned near at least one of a constructive notice language, marking notice language, notice symbol, intellectual property notice language, registered intellectual property mark symbol, pending intellectual property mark symbol, service mark symbol, trademark symbol, patent mark symbol, virtual patent marking language, copyright mark symbol, and HTML notice symbol ("™", "®", "©", "℗" and similar Unicode related symbols) and matching the one or more candidate intellectual property marks found in one or more records of the public company intellectual property mark owner database or also by detecting in the content one or more candidate intellectual property marks positioned near at least one of a company name, inventory identifier, domain name, item name, item description, image description, metadata, <TITLE> tag, <META> tag, <IMG> tag, HTML data-* attributes, banner advertisement, and hashtag and matching the one or more candidate intellectual property marks found in one or more records of the public company intellectual property mark owner database.

The public company intellectual property mark owner database can be curated and updated from at least one of a one or more government intellectual property application, registration, and issuance databases and one or more submissions of intellectual property marks from one or more public companies authenticating their ownership of the one or more submissions of the intellectual property marks. The public company intellectual property mark owner database can include one or more records having at least one of a text, image, audio, and media object recognition data representative of and corresponding to the intellectual property mark and the intellectual property mark analysis engine is in operative communication with a media recognition engine determining that the at least a portion of the content includes the intellectual property mark. The intellectual property mark can be at least one of a text and image of one of a patent, trademark, service mark, brand name, trade name, copyright title, logo, and domain name.

Content can be received in response to receiving at least one network request for content by at least one of a server device, client device, cloud device, and peer device where the at least one network request can be at least one of a resource location request, internet search engine request, electronic shopping cart request, image recognition request, and ad banner request. For instance, content can be at least one search result from an internet search engine request or of an electronic shopping cart request to checkout an item added to the electronic shopping cart or of an item in a shopping cart and the content is an electronic receipt of the item corresponding to the intellectual property mark further including determining that a manufacturer of the item is a publicly traded company corresponding to the intellectual property.

Content can further include at least one of a web page content, closed caption content, catalog content, social network content, messaging content, broadcasting content, streaming content, text content, image content, audio content, and video content and does not include results of an intellectual property mark search or product code search. Network requests can be at least one of a generated, received, and processed by at least one of an application, electronic trading system, search engine, browser, browser extension, applet, and browser helper object. Enhanced content presented along with requested content can include presenting at least one option to the user for performing an operative function corresponding to the ticker symbol by accessing at least one of an electronic trading system, watch list window, quote window, news window, order entry window, options chain window, and price chart window corresponding to the ticker symbol for the performing the operative function.

Although the invention has been shown and described with respect to a certain preferred aspect or aspects, it is obvious that equivalent alterations and modifications will occur to others skilled in the art upon the reading and understanding of this specification and the annexed drawings. In particular regard to the various functions performed by the above described items referred to by numerals (components, assemblies, devices, compositions, etc.), the terms (including a reference to a "means") used to describe such items are intended to correspond, unless otherwise indicated, to any item which performs the specified function of the described item (e.g., that is functionally equivalent), even though not structurally equivalent to the disclosed structure which performs the function in the herein illustrated exemplary aspect or aspects of the invention. In addition, while a particular feature of the invention may have been described above with respect to only one of several illustrated aspects, such feature may be combined with one or more other features of the other aspects, as may be desired and advantageous for any given or particular application.

The description herein with reference to the figures will be understood to describe the present invention in sufficient detail to enable one skilled in the art to utilize the present invention in a variety of applications and devices. It will be readily apparent that various changes and modifications could be made therein without departing from the spirit and scope of the invention as defined in the following claims.

I claim:

1. A method implemented on a computer system by one or more processors configured to execute instructions that, when executed by the one or more processors, direct the computing system to perform steps comprising:
    receiving content to be displayed to a user, wherein the content does not include results of a universal product code search request;
    a constructive notice discovery engine determining that a constructive notice language is included in the content;
    parsing a particular portion of the content located within a predetermined distance of the constructive notice language;
    detecting a candidate intellectual property mark within the particular portion of the content;
    determining by searching a public company intellectual property mark owner database that the candidate intellectual property mark is an intellectual property mark owned by a publicly traded company;
    retrieving, from a database, a ticker symbol corresponding to the publicly traded company that owns the intellectual property mark;
    modifying the particular portion of the content to generate modified content in which at least a portion of the particular portion is visually enhanced;
    displaying the modified content to the user, including displaying a user-selectable option associated with the visually enhanced portion;
    the user selecting the user-selectable option; and,
    accessing at least one of an electronic trading system, a watch list window, a quote window, a news window, an order entry window, an options chain window, and a price chart window corresponding to the retrieved ticker symbol of the publicly traded company in response to the user selecting the user-selectable option.

2. The method of claim 1, wherein the public company intellectual property mark owner database includes one or more records of the publicly traded company corresponding to one or more intellectual property marks owned by the publicly traded company.

3. The method of claim 2, wherein the parsing step further includes parsing words and phrases in the content and identifying one or more intellectual property marks by matching at least one word and phrase of the words and phrases found in one or more records of the public company intellectual property mark owner database.

4. The method of claim 1, wherein the constructive notice language includes at least one of marking notice language, a notice symbol, intellectual property notice language, a registered intellectual property mark symbol, a pending intellectual property mark symbol, a service mark symbol, a trademark symbol, a patent mark symbol, virtual patent marking language, a copyright mark symbol, an HTML notice symbol ("™", "®", "©", "&copysr"), and an Unicode notice symbol ("©", "®", "℗", "℠", "™").

5. The method of claim 1, wherein the candidate intellectual property mark is positioned within a predetermined distance of at least one of a company name, an inventory identifier, a domain name, an item name, an item description, an image description, metadata, a <TITLE> tag, a <META> tag, an <IMG> tag, HTML data-* attributes, a banner advertisement, and a hashtag.

6. The method of claim 1, wherein the public company intellectual property mark owner database is curated and updated from at least one of a one or more government intellectual property application, registration, and issuance databases and one or more submissions of intellectual property marks from one or more public companies authenticating their ownership of the one or more submissions of the intellectual property marks.

7. The method of claim 1, wherein the public company intellectual property mark owner database includes one or more records having at least one of a text, an image, audio, and media object recognition data representative of and corresponding to the intellectual property mark and the method further includes communicating with a media recognition engine in determining whether the content includes the intellectual property mark.

8. The method of claim 1, wherein the receiving step further includes receiving the content in response to receiving at least one network request.

9. The method of claim 8, wherein the at least one network request is received by at least one of a server device, a client device, a cloud device, and a peer device.

10. The method of claim 8, wherein the at least one network request is at least one of a resource location request, an internet search engine request, an electronic shopping cart request, an image recognition request, and an ad banner request.

11. The method of claim 8, wherein the at least one network request is an internet search engine request and the content is at least one search result.

12. The method of claim 8, wherein the at least one network request is an electronic shopping cart request and the content is an item added to the electronic shopping cart corresponding to the intellectual property mark, the method further including determining that a manufacturer of the item is the publicly traded company.

13. The method of claim 8, wherein the at least one network request is an electronic shopping cart request to checkout an item in a shopping cart and the content is an electronic receipt of the item corresponding to the intellectual property mark, the method further including determining that a manufacturer of the item is the publicly traded company.

14. The method of claim 8, wherein the at least one network request is at least one of a generated, received, and processed by at least one of an application, an electronic trading system, a search engine, a browser, a browser extension, an applet, and a browser helper object.

15. The method of claim 1, wherein the content includes at least one of a web page content, closed caption content, catalog content, social network content, messaging content, broadcasting content, streaming content, text content, image content, audio content, and video content.

16. The method of claim 1, wherein the content does not include results of an intellectual property mark search.

17. The method of claim 1, wherein the intellectual property mark is at least one of an image and text of one of a patent, a trademark, a service mark, a brand name, a trade name, a copyright title, a logo, and a domain name.

18. A non-transitory computer readable storage medium having instructions stored thereon that, upon execution by a computer system, cause the computer system to perform a method comprising:
receiving content to be displayed to a user, wherein the content does not include results of a universal product code search request;
a constructive notice discovery engine determining that a constructive notice language is included in the content;
parsing a particular portion of the content located within a predetermined distance of the constructive notice language;
detecting a candidate intellectual property mark within the particular portion of the content;
determining by searching a public company intellectual property mark owner database that the candidate intellectual property mark is an intellectual property mark owned by a publicly traded company;
retrieving, from a database, a ticker symbol corresponding to the publicly traded company that owns the intellectual property mark;
modifying the particular portion of the content to generate modified content in which at least a portion of the particular portion is visually enhanced;
displaying the modified content to the user, including displaying a user-selectable option associated with the visually enhanced portion;
the user selecting the user-selectable option; and,
accessing at least one of an electronic trading system, a watch list window, a quote window, a news window, an order entry window, an options chain window, and a price chart window corresponding to the retrieved ticker symbol of the publicly traded company in response to the user selecting the user-selectable option.

19. An apparatus, comprising:
processing circuitry configured to
receive content to be displayed to a user, wherein the content does not include results of a universal product code search request;
determine with a constructive notice discovery engine that a constructive notice language is included in the content;
parse a particular portion of the content located within a predetermined distance of the constructive notice language;
detect a candidate intellectual property mark within the particular portion of the content;
determine by a search of a public company intellectual property mark owner database that the candidate intellectual property mark is an intellectual property mark owned by a publicly traded company;
retrieve, from a database, a ticker symbol corresponding to the publicly traded company that owns the intellectual property mark;
modify the particular portion of the content to generate modified content in which at least a portion of the particular portion is visually enhanced;
display the modified content to the user including the display of a user-selectable option associated with the visually enhanced portion;
select the user-selectable option; and,
access at least one of an electronic trading system, a watch list window, a quote window, a news window, an order entry window, an options chain window, and a price chart window corresponding to the retrieved ticker symbol of the publicly traded company in response to the selection of the user-selectable option.

\* \* \* \* \*